United States Patent
Bosworth et al.

[15] 3,645,001
[45] Feb. 29, 1972

[54] CARRIAGE AND RAIL ASSEMBLY FOR A HIGH-RESOLUTION MECHANICAL POSITIONER

[72] Inventors: Robert H. Bosworth, Convent Station; Burton W. Roney, Wayne, both of N.J.

[73] Assignee: The Bendix Corporation

[22] Filed: Jan. 28, 1970

[21] Appl. No.: 6,627

[52] U.S. Cl. ............................................. 33/162, 33/147 R
[51] Int. Cl. ........................................................ G01b 5/14
[58] Field of Search ................ 33/162, 143 R, 143 I, 168 R, 33/147 R

[56] References Cited

UNITED STATES PATENTS

| | | | |
|---|---|---|---|
| 3,247,598 | 4/1966 | Wilkes | 33/162 |
| 1,351,528 | 8/1920 | Martin | 33/162 |
| 1,655,133 | 1/1928 | Clase | 33/162 X |
| 2,308,946 | 1/1943 | Wagner | 33/162 X |

*Primary Examiner*—William D. Martin, Jr.
*Attorney*—Herbert L. Davis and Plante, Arens, Hartz, Smith and Thompson

[57] ABSTRACT

A carriage and rail assembly for a high-resolution mechanical positioner suitable for application to apparatus such as optical benches, inspection fixtures, machine tools and photography fixtures for effecting extreme position accuracy and resolution with low friction. The mechanical positioner may include an adjustable top plate or slide block mounted in parallel relation with respect to a baseplate or carriage block by means of mounting rods. Carriage rods or tracks extend perpendicular to the mounting rods and are fixed at opposite ends in flanges which project at right angles to opposite end portions of the baseplate or carriage block, while additional positioning rods or tracks are fixed at opposite ends in flanges which project at right angles to opposite end portions of the adjustable slide block. An actuating member by means of bushings or antifriction bearings is slidably mounted on the respective carriage and positioning rods in an arrangement in which the actuating member is mechanically coupled to the slide block through the positioning rods which are inclined in a predetermined angular relation to the carriage rods so that a horizontal positioning of the actuating member effects a vertical adjustment of the position of the slide block relative to the carriage block. The ratio of the horizontal adjustment of the actuating member relative to the vertical adjustment of the slide block is dependent upon the predetermined inclined angular relation of the positioning rods to the carriage rods in an arrangement such that the slide block may be adjusted with extreme position accuracy, resolution and with low friction.

6 Claims, 13 Drawing Figures

Patented Feb. 29, 1972

INVENTORS
Robert H. Bosworth
Burton W. Roney
BY Herbert L. Davis
ATTORNEY

INVENTORS
Robert H. Bosworth
Burton W. Roney
BY
Herbert L. Davis
ATTORNEY

Patented Feb. 29, 1972

INVENTORS
Robert H. Bosworth
Burton W. Roney
BY
*Herbert T. Harris*

ATTORNEY

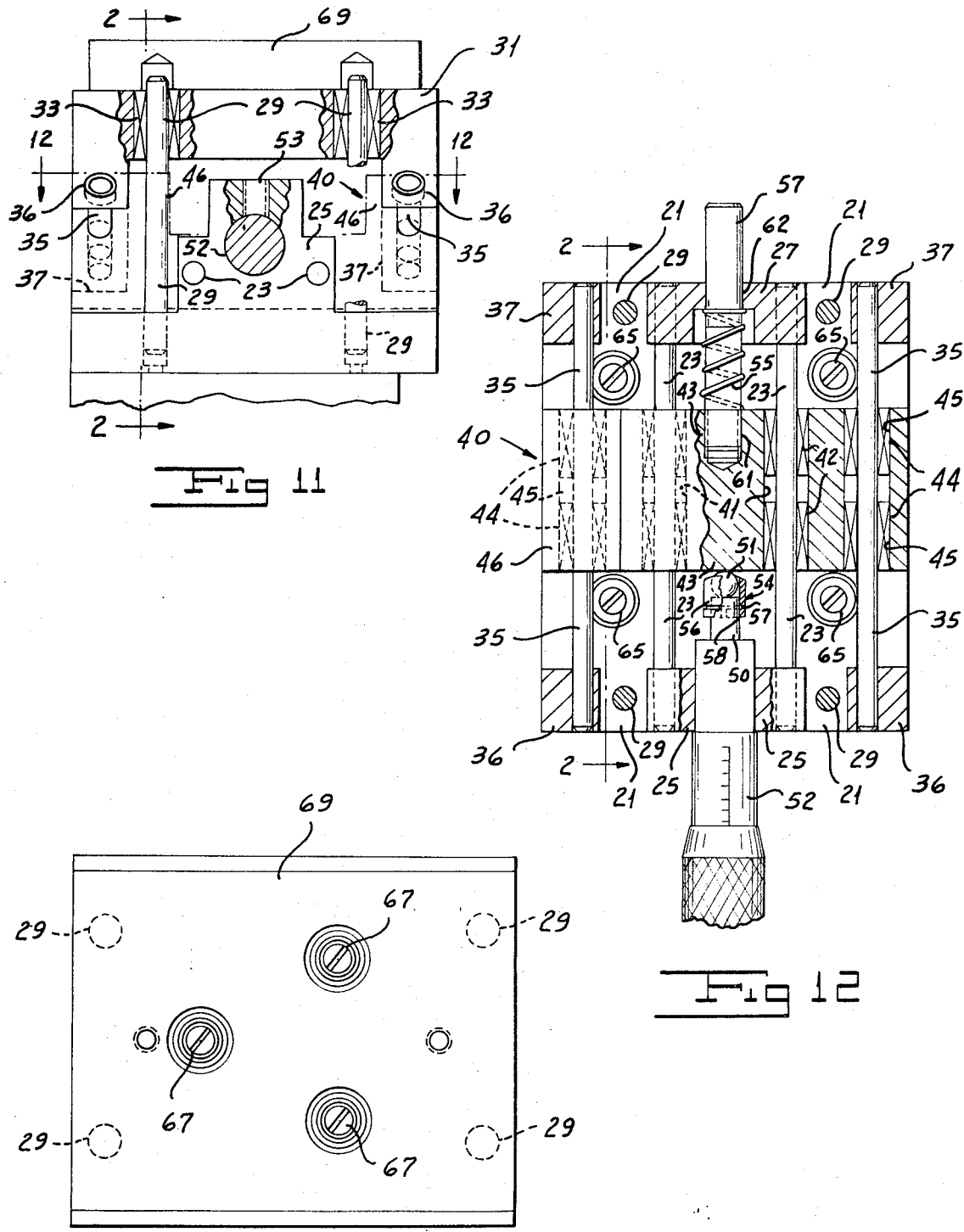

CARRIAGE AND RAIL ASSEMBLY FOR A HIGH-RESOLUTION MECHANICAL POSITIONER

BACKGROUND OF THE INVENTION

1. Field of the Invention

A mechanical positioner capable of high resolution and suitable for application to apparatus such as optical benches, inspection fixtures, machine tools and photography fixtures so as to provide a precise means of attaining an adjustable position of a part.

2. Description of the Prior Art

Heretofore, it has been a well-known expedient to adjustably position a part of a block gauge as disclosed in a U.S. Pat. No. 3,247,598, granted Apr. 26, 1966 to Glenn E. Wilkes, and which block gauge includes two wedges, one being adapted for vertical movement and the other being adapted for horizontal movement so as to effect a height variation of the one wedge as determined by the horizontal position of the other wedge effected by a rotatable adjustment of a threaded shaft by means of an operator-operative knob. Moreover a U.S. Pat. No. 2,807,881, granted Oct. 1, 1957 to Mustafa Ozbilgic, teaches an adjustable step block gauge which functions in a manner similar to the gauge disclosed by the Wilkes U.S. Pat. No. 3,247,598, but in which there is employed a clamping member for securing a workpiece in a position determined by that of an adjustable step block.

Furthermore a U.S. Pat. No. 2,867,909, granted Jan. 13, 1959 to Karl L. Keller, discloses a parallel gauge in which a slide member is mounted for vertical movement on a gauge base member and locked in position by an operator-operative knob, while a U.S. Pat. No. 1,562,554, granted Nov. 24, 1925 to George J. Hardgrove, teaches a height gauge including a block that is mounted for slidable movement along an inclined face of a base member and in which a micrometer is provided for precise measurement.

Moreover there has been noted a U.S. Pat. No. 2,743,527, granted May 1, 1956 to Donald I. Gens, in which there is disclosed a height gauge employing sliding wedge surfaces for varying the heighth of the gauge tool, while a U.S. Pat. No. 3,359,055, granted Dec. 19, 1967 to Bjorn O. Krause, discloses an automatic focusing device for a microscope including a slide platform which includes a graduated scale that is adapted for movement with respect to a focusing wedge which is secured to a platform.

The prior operative arrangement and assembly of a block gauge includes wedges adapted for effecting a vertical movement of one block upon a horizontal adjustment of another block. Such arrangement in which the one block is mounted for slidable movement on an inclined surface face thereof along an inclined surface face of the other block is inherently subject to the attendant friction involved in the adjustment of the one inclined surface face along the other inclined surface face, together with the disadvantages in complexity, size of the assembly and in the operation thereof.

In such prior art references, there is no suggestion of a carriage and rail assembly for a high-resolution mechanical positioner in which an adjustable top plate or slide block is slidably mounted on rods carried by a base or carriage block so that the slide block may be adjustably positioned in relation to the carriage block by means of an actuating member coupled to the slide block. The actuating member is in turn drivably mounted for slidable adjustment in one sense on a pair of carriage rods fixedly mounted on one of the blocks and extending in parallel relation thereto. Moreover the actuating member is also slidably mounted on a pair of positioning rods or tracks carried by the other of said blocks and extending in a predetermined inclined angular relation to the carriage rods. The arrangement is such that upon the actuating member being adjustably positioned on the pair of carriage rods extending in parallel relation to the baseplate, there will be mechanically coupled through the inclined angularly extending pair of positioning rods carried by the other of said blocks an adjustment in the position of the one block relative to the other block with extreme accuracy and resolution and with low friction due to the provision of antifriction bearing means supporting the actuating member in slidable relation to the respective carriage and positioning rods.

Furthermore there is no suggestion in the prior art references of an operator-operative setscrew means cooperating in the manner herein provided with one of the pair of carriage rods to lock the actuating member and thereby the adjustable slide block in a predetermined adjusted position.

Moreover the present invention rests in a conception which simplifies the assembly of a mechanical positioner by the provision of a novel actuating member arranged in slidable relation with a pair of carriage bars carried by a baseplate and a pair of inclined positioning tracks or bars carried by an adjustable top plate or slide block. Furthermore the assembly of the present invention is such as to raise the percent of durability and certainty of operation of the mechanical positioner so as to effect a condition of extreme position accuracy and resolution with low friction and one which is more sure to produce the desired result in emergency and not only with greater certainty, but with less expense.

SUMMARY OF THE INVENTION

The invention contemplates the provision of a high-resolution mechanical positioner in which one part may be adjustably positioned in one sense relative to another part by adjustably positioning an actuating member in another sense perpendicular to the first-mentioned sense and in which arrangement the actuating member includes antifriction bearing means for slidably mounting the actuating member on a pair of rods carried by and extending in parallel relation to said one part of the mechanical positioner, together with other antifriction bearing means for mounting the actuating member on a pair of other rods extending in a predetermined angular inclined relation to the first-mentioned rods carried by the other of the parts of the mechanical positioner. Thus one of the parts of the mechanical positioner is slidably mounted by additional antifriction bearing means on rods carried by the other part of the mechanical positioner so that the adjustable positioning of the one part relative to the other part is limited to the movement of the parts relative one to the other in said first-mentioned sense upon the adjustable positioning of the actuating member in said second-mentioned sense being perpendicular to said first sense.

The invention contemplates as another object, the provision in the aforenoted arrangement of spring means for biasing the actuating member in said second sense into operative relation to an adjustably positioned part of a micrometer including a ball to make a point contact with a surface of the actuating member so that there may be effected extreme accuracy and resolution in the positioning of the one part relative to the other part and with low friction due to the carriage and rail assembly of the positioner.

Another object of the invention is to provide in the aforenoted arrangement novel means whereby the adjustment of the one part relative to the other part of the positioner may be easily made by a micrometer adjustment and in which arrangement the position of the one part relative to the other part may be easily locked in the adjusted relation by means of a setscrew cooperating with one of the rails on which the actuating member is slidably mounted so as to in turn effectively lock the one and the other of the parts of the mechanical positioner in an adjusted relation.

These and other objects and features of the invention are pointed out in the following description in terms of the embodiments thereof which are shown in the accompanying drawings. It is to be understood however that the drawings are for the purpose of illustration only and are not a definition of the limits of the invention. Reference is to be had to the appended claims for this purpose.

DESCRIPTION OF THE DRAWINGS

In the drawings corresponding numerals indicate corresponding parts in the several views:

FIG. 11 is an end view of the mechanical positioner of FIG. 2 with certain parts broken away so as to better illustrate the operative arrangements of the parts of the positioner.

FIG. 12 is a top plan sectional view of FIG. 11 taken along the lines 12—12 and looking in the direction of the arrows.

FIG. 13 is a top plan view of the mounting plate on the slide block of FIG. 2 taken along the lines 13—13 and looking in the direction of the arrows.

DESCRIPTION OF THE INVENTION

Figure 1:
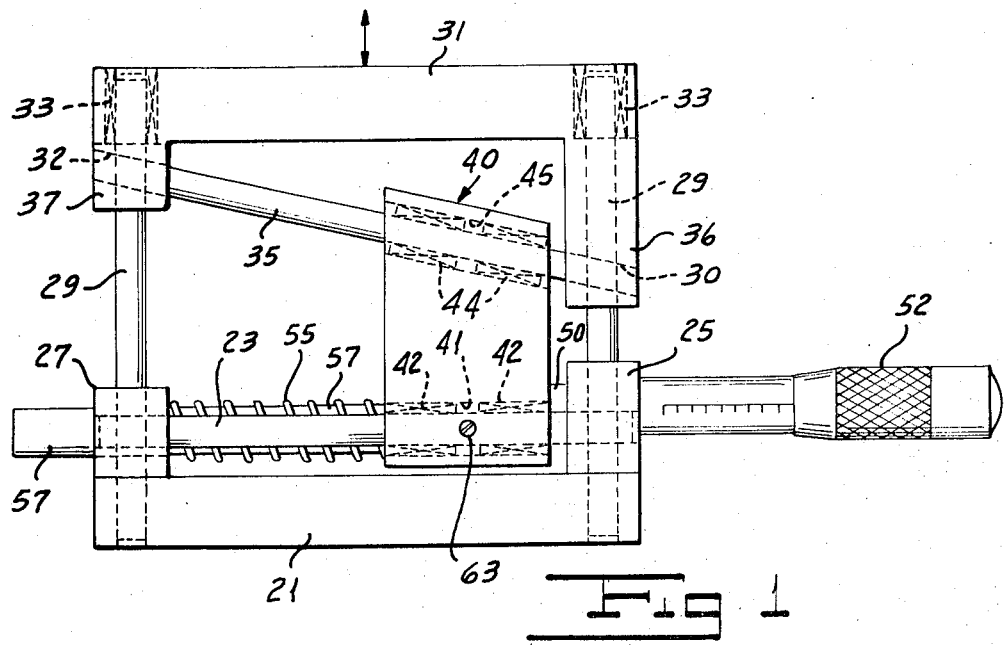
FIG. 1 is a schematic view of a high-resolution mechanical positioner embodying the present invention.
Figure 2:
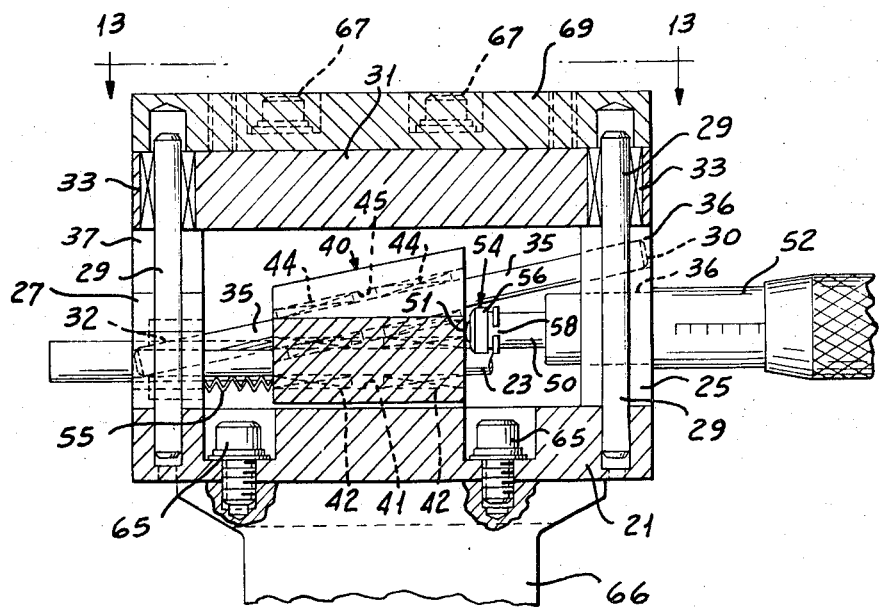
FIG. 2 is a sectional view of a detail assembly of a high-resolution mechanical positioner embodying the invention and taken along the lines 2—2 of FIGS. 11 and 12 and looking in the direction of the arrows.
Figure 8:
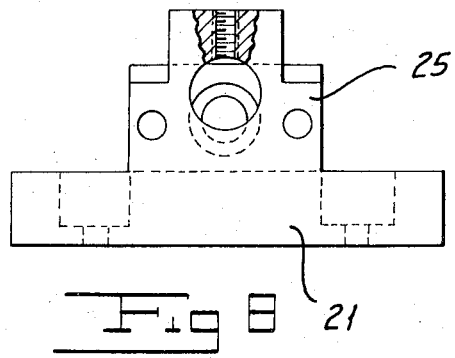
FIG. 8 is an end view of the carriage plate of FIG. 2 illustrating an end flange for supporting the micrometer shown in assembled relation in FIG. 11.
Figure 9:
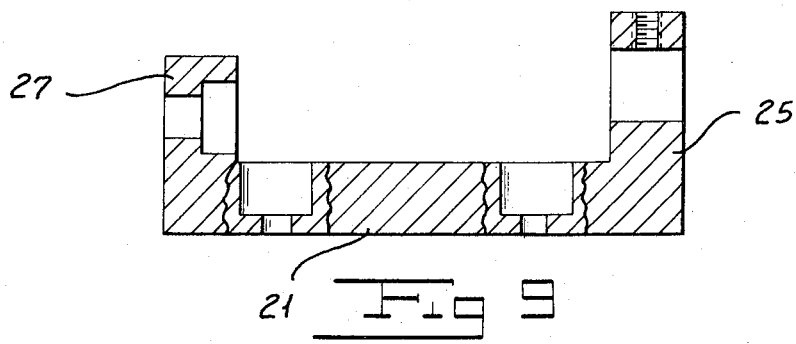
FIG. 9 is a detail side sectional view of the carriage block of FIG. 8 which is shown in assembled relation in FIG. 2.
Figure 10:
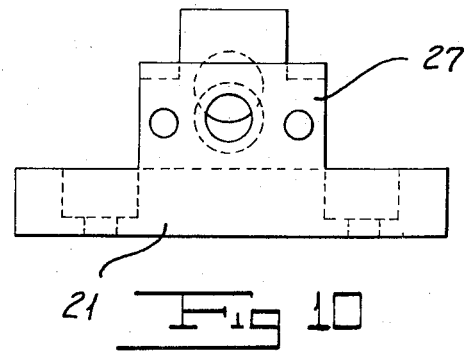
FIG. 10 is an end view of the carriage block of FIG. 2 and illustrating a spring-supporting end flange shown in assembled relation in FIG. 12 at an opposite end of the carriage block from the micrometer supporting end flange of FIG. 8.

In the form of the invention illustrated schematically by FIG. 1, there is provided a baseplate or carriage block 21, shown in detail by FIGS. 8, 9 and 10, in which two hardened steel rods or tracks 23 are fixed at opposite ends in end flanges 25 and 27 which project at right angles to opposite end portions of the baseplate 21, as shown in the detail assembly by FIGS. 2, 11 and 12. These rods 23 are arranged in parallel relation one to the other and to the underside of the baseplate 21 and further extend perpendicular to and are affixed in the end flanges 25 and 27 of the base plate 21. Four additional rods or tracks 29 are pressed into the baseplate 21 one at each corner, as shown in detail by FIG. 12, and these tracks 29 extend parallel to each other and perpendicular to the bottom of the baseplate or carriage block 21 and perpendicular to the carriage tracks 23.

Figures 3, 4:
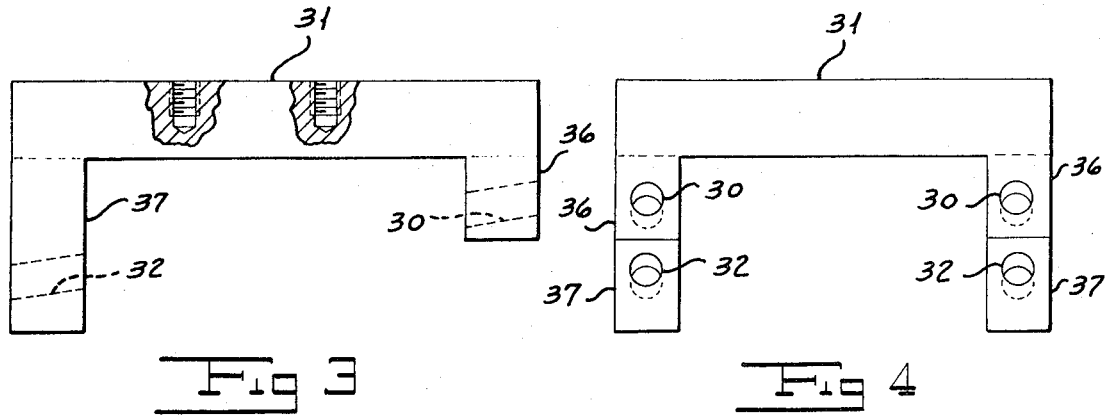
FIG. 3 is a detail side view of the adjustable top plate or slide block shown in assembled relation in FIG. 2.
FIG. 4 is a detail end view of the top plate or slide block of FIG. 3 and which is shown in assembled relation in FIG. 11.

Further an adjustable top plate or slide block 31, shown in detail by FIGS. 3 and 4, is slidably mounted on tracks or rods 29 by antifriction bearings 33 carried by the slide block 31. The mounting rods or tracks 29 are shown in assembled relation by FIGS. 2 and 11.

A pair of hardened steel positioning rods or tracks 35 are fixed at opposite ends in end flanges 36 and 37 which project at right angles to the top surface of the top plate or adjustable slide block 31. The end flanges 36 project from opposite corners at one end of the slide block 31, while the end flanges 37 project from opposite corners at an opposite end of the slide block 31, as shown in detail by FIGS. 3 and 4. The ends of the positioning rods 35 are mounted in holes 30 and 32 drilled at a predetermined angle in the end flanges 36 and 37 respectively, so that the rods 35 extend at an inclined angle to the rods 23 and to the top surface of the top plate 31, between the respective end flanges 36 and 37 and in parallel relation one to the other.

The four upright mounting posts 29 project from the carriage plate 21 and are slidably mounted in the antifriction bearings 33 carried by slide block 31 so as to permit adjustment of the slide block 31 relative to the baseplate 21 in a direction along the mounting rods 29 in a purely vertical sense, as shown by the schematic view of FIG. 1.

Figure 7:
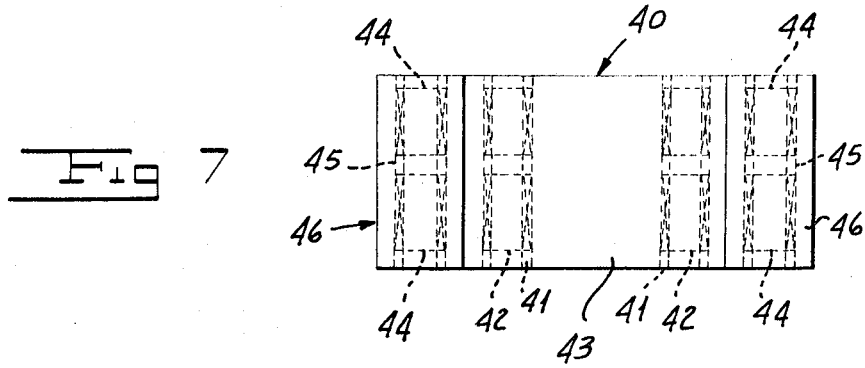
FIG. 7 is a detail top plan view of the actuating member illustrated by FIGS. 5 and 6.
Figures 5, 6:
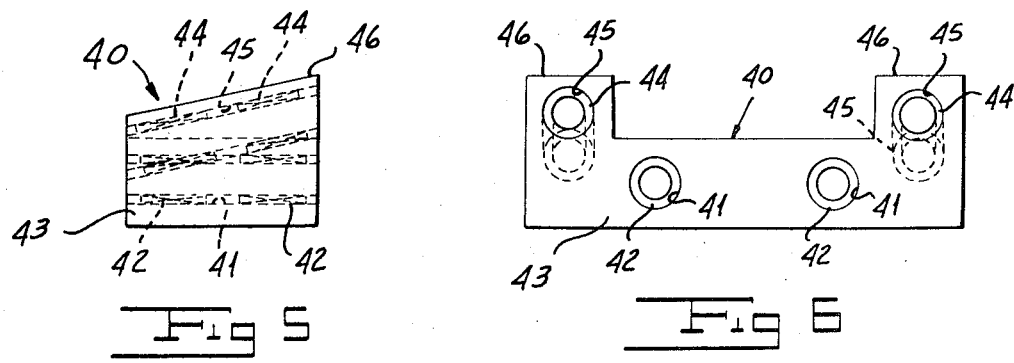
FIG. 5 is a detail side view of the actuating member shown in assembled relation in FIG. 2.
FIG. 6 is an end view of the actuating member of FIG. 5 and which is shown in assembled relation in FIG. 11.

Positioned intermediate the base or carriage plate 21 and the top plate or slide block 31 is an actuating member 40, shown in detail by FIGS. 5, 6 and 7, in which are provided antifriction bearings 42 mounted in passages 41 formed in a base 43 of the actuating member 40 and extending longitudinally through the base 43 in a parallel horizontal relation such that the pair of carriage rods 23 may be slidably mounted in the bearings 42 and extend through the actuating member 40, as shown in assembled relation by FIGS. 2 and 12.

Further there are provided antifriction bearings 44 mounted in passages 45 formed in flanges 46 which project from opposite side portions of the base 43. The passages 45 extend longitudinally through the flanges 46 in parallel relation one to the other and are inclined in a predetermined angular relation such that the pair of positioning rods 35 may be slidably mounted in the bearings 44 in passages 45 and extend through the actuating member 40 in a predetermined angular relation to the horizontally extending carriage rods 23.

The pair of carriage rods 23 supported by the baseplate 21 and the pair of positioning tracks 35 carried by the adjustable slide block 31 are so arranged that a positioning of the actuating member 40 in a horizontal sense, as illustrated schematically in FIG. 1, will effect an adjustment in the position of the top plate or slide block 31 relative to the base plate 21 in a vertical sense.

Bearing upon one end surface of the actuating member 40 is an adjustable element 50 which may be a differential screw or a micrometer head of a suitable operator-operative micrometer 52 mounted in the end flange 25 of the baseplate 21 as shown schematically by FIG. 1.

Moreover, as shown by FIGS. 2 and 12, there may be attached to a free end of the adjustable element 50, a ball 51 captured by a cap 54, shown in assembled relation in FIG. 2, while in FIG. 12 the cap 54 is shown partially broken away. The cap 54, as illustrated in FIGS. 2 and 12, includes a split collar 56 having a channel 57 extending partially around the collar 56 and split at 58 so that the cap 54 may be resiliently received on the free end of the adjustable element 50 so that the ball 51 is positioned in a point-contacting relation with a flat end surface of the base 43 of the actuating member 40, as illustrated by FIGS. 2 and 12, as well as in a point contact with a flat end surface of the free end of the adjustable element 50 of the micrometer 52, as shown by FIG. 12. The micrometer 52 is secured in the end flange 25 by a setscrew 53, as shown by FIG. 11.

Further bearing upon an opposite end surface of the actuating member 40 is a spring 55 which, as shown by FIG. 12, is mounted between the end flange 27 and an end surface of the base 43 of the actuating member 40 by a stud 57. The stud 57 is screw threadedly engaged at 61 in the base 43 of the actuating member 40 and slidably mounted at 62 in the end flange 27. The stud 57 serves as a guide for the spring 55 which provides a constant force for biasing the actuating member 40 into operative relation with the end of the differential screw or ball 51 of the micrometer head 50 so that the adjusted position of the actuating member 40 in a horizontal sense on the carriage rods 23 and positioning rods 35, as shown by FIG. 2, may be located with extreme accuracy by the adjustment of the micrometer 52, whereby the adjusted position of the top plate 31 in a vertical sense may be readily established.

Moreover by suitably selecting the angle that the positioning rods 35 are inclined with respect to the horizontally extending carriage rods 23, the ratio of the horizontally adjusted position of the actuating member 40 to the resultant vertically adjusted position of the top plate 31 may be selected. Moreover by changing the angle that the positioning rods 35 are inclined, this ratio between the horizontally adjusted position of the actuating member 40 to the resultant vertically adjusted position of the top plate 31 may be readily changed.

It has been determined, by way of example, that for an angular relation of 11° 30′ between the horizontally extending rods 23 and the angularly extending rods 35, the relation of the vertical motion of the top plate 31 resulting upon a horizontal motion being imparted to the actuating member 40 is 0.200 of an inch of vertical movement of the top plate 31 for each 1.000 inch of horizontal movement of the actuating member 40.

Moreover for a greater angular relation of for example an angular relation of 14° 2′ between the horizontally extending rods 23 and the angularly extending rods 35, the relation of the vertical motion of the top plate 31 resulting upon a horizontal motion being imparted to the actuating member 40 is 0.250 of an inch of vertical movement of the top plate 31 for each 1.000 inch of horizontal movement of the actuating member 40.

Thus as the angular relation between the rods 23 and the rods 35 is decreased in a sense approaching the horizontal relation or angular coincidence with that of the rods 23, the ratio of vertical motion of the top plate 31 to a horizontal motion imparted to the actuating member 40 is effectively decreased. Thus resulting in greater resolution.

Conversely as the angular relation between the horizontally extending rods 23 and the angularly extending rods 35 is increased in a sense approaching 45° the ratio of vertical motion of the top plate 31 to a horizontal motion imparted to the actuating member 40 is effectively increased until as the 45° angular relationship is reached there will be effected 1.000 inch of vertical movement of the top plate 31 for each 1.000 inch of horizontal movement of the actuating member 40 or a 1-to-1 relationship at which there would result no apparent advantage in resolution.

It will be seen then that the predetermined angular relation that the positioning rods 35 extend relative to the carriage rods 23 is selected from a range of angular values having a minimum value greater than that of angular coincidence with the horizontally extending carriage rods 23 and a maximum value of less than 45° so that the ratio of an increment of adjustment imparted to the top plate or slide block 31 in a vertical or one sense relative to the carriage block 21 for each increment of adjustment of the actuating member 40 in a horizontal or other sense is directly dependent upon the extent that the predetermined angular relation exceeds that of angular coincidence with the horizontally extending carriage rods 23. Thus there will be imparted with an increase in the selected predetermined angular relation a greater increment of adjustment of the slide block 31 in said one sense for each increment of adjustment of the actuating member 40 in said other sense.

On the other hand the extent of resolution in the adjustment of the top plate or slide block 31 in said one sense for each increment of adjustment of the actuating member 40 in said other sense is directly dependent upon the extent that the predetermined angular relation is less than that of 45° so as to impart with decrease in such predetermined angular relation a greater resolution in the increment of adjustment of the slide block 31 in said one sense for each increment of adjustment of the actuating member 40 in said other sense.

Furthermore by the provision of an adjustable setscrew 63 screw threadedly engaged in the actuating member 40 and arranged to engage one of the carriage tracks 23, as shown schematically in FIG. 1, the adjusted position of the actuating member 40 on the carriage tracks 23 in a horizontal sense may be readily locked in a predetermined position. This in turn causes the adjusted position of the top plate 31 in a vertical sense to be likewise locked in position.

Furthermore the high-resolution mechanical positioner, shown schematically by FIG. 1, may be constructed of standard parts, i.e., a standard micrometer head and standard shafts and bushings at a relatively low-manufacturing cost to effect the extreme position accuracy and resolution with low friction, as herein desired.

Moreover while the invention has been illustrated schematically in FIG. 1, the detail structure of a mechanical positioner embodying the present invention is illustrated by FIGS. 2-13 in which corresponding parts have been indicated by like numerals to those described with reference to FIG. 1, and therefore no further explanation thereof is deemed necessary.

It may be noted however that the carriage plate 21, as shown by FIG. 2, may be suitably fastened by securing bolts 65 to a mounting assembly 66 which forms no part of the present invention, while the top plate 31 may have secured thereto by bolts 67 a mounting plate 69 of a device to be operatively positioned by the mechanical positioner.

What is claimed is:

1. In a mechanical positioner of a type including a carriage block and a slide block mounted in parallel relation to the carriage block and arranged to be slidably positioned in a first sense relative to the carriage block; the improvement comprising mounting track means projecting from one of the blocks, first bearing means for slidably mounting another of said blocks on the mounting track means so as to permit the slide block to be adjustably positioned relative to the carriage block in said first sense, an actuating member, carriage track means mounted on one of said blocks and extending in parallel relation to said one block, positioning track means mounted on another of said blocks and extending in a predetermined inclined angular relation to the carriage track means, second bearing means for slidably mounting the actuating member on the carriage track means so as to permit the actuating member to be adjustably positioned thereon in a second sense perpendicular to said first sense, third bearing means for slidably mounting the actuating member on the positioning track means extending in said predetermined inclined angular relation to said carriage track means, said carriage track means and said positioning track means extending through said actuating means in slidable relation with said second and third bearing means so as to cause said positioning track means extending in said predetermined inclined angular relation to said carriage track means to impart an adjustment to the position of said slide block in said one sense relative to said carriage block upon the actuating member being slidably positioned in said second sense on the carriage track means.

2. The improvement defined by claim 1 including operator-operative means carried by one of said blocks for adjustably positioning said actuating member on said carriage track means in said second sense.

3. The improvement defined by claim 2 including another operator-operative means for locking the actuating member in an adjusted position in said second sense and thereby the slide block in an adjusted position in said first sense relative to said carriage block.

4. The improvement defined by claim 2 in which the operator-operative means carried by one of said blocks includes an adjustable element bearing upon an end surface of the actuating member so as to limit the positioning in said second sense of said actuating member in one direction on said carriage track means, and spring means carried by one of said blocks for biasing the actuating member on said carriage track means in said second sense and in said one direction on said carriage track means into contacting relation with said adjustable element of the operator-operative means.

5. The improvement defined by claim 2 in which the carriage track means includes a pair of carriage rods, first mounting flanges projecting from opposite ends of the carriage block, the carriage rods being affixed at opposite ends in the mounting flanges and extending between the first mounting flanges in parallel relation to the carriage block, and the positioning track means includes a pair of positioning rods, second mounting flanges projecting from opposite ends of the slide block, the positioning rods being affixed at opposite ends in the second mounting flanges and extending between the second flanges in a predetermined angular relation to the pair of carriage rods, the predetermined angular relation being preselected from a range of angular values having a minimum angular value greater than that of angular coincidence with the pair of carriage rods and a maximum angular value of less than that of 45°, one of the positioning rods extending at one side of the carriage rods and another of the positioning rods extending at an opposite side of the carriage rods, the second bearing means slidably mounting the actuating member on the pair of carriage tracks extending between said first mounting flanges and through the actuating member, the third bearing means slidably mounting the actuating member on the pair of positioning tracks extending through said actuating member in said predetermined angular relation to said carriage tracks and between said second mounting flanges, and the operator-operative means includes adjustable means carried by said first mounting flanges and extending between said pair of carriage rods into operative relation with opposite ends of the actuating member to slidably position the actuating member on said pair of carriage tracks in said second sense upon operation of the adjustable means of the operator-operative means, the positioning of the actuating member in said second sense causing the third bearing means slidably mounting the actuating member on the inclined positioning rods to impart through the pair of positioning rods an adjustment in the position of the slide block on the mounting track means in said first sense, the ratio of the adjustment imparted to the slide block in said first sense upon adjustment of the actuating member in said second sense being dependent upon the predetermined angular relation of the pair of positioning rods to the pair of carriage rods extending between the first mounting flanges and in parallel relation to the carriage block.

6. The improvement defined by claim 5 in which the adjustable means carried by said first mounting flanges includes an operator-operative micrometer carried by one of said first mounting flanges and including a head element adjustably positioned by the micrometer to effectively limit the position in said second sense of the actuating member in one direction, and spring means carried by the other of said first mounting flanges for biasing the actuating member in said second sense in slidable relation on said pair of carriage rods in said one direction into the limited relation with the head element as adjustably positioned by the micrometer.

* * * * *